United States Patent
Qian et al.

(10) Patent No.: US 10,783,873 B1
(45) Date of Patent: Sep. 22, 2020

(54) NATIVE LANGUAGE IDENTIFICATION WITH TIME DELAY DEEP NEURAL NETWORKS TRAINED SEPARATELY ON NATIVE AND NON-NATIVE ENGLISH CORPORA

(71) Applicant: Educational Testing Service, Princeton, NJ (US)

(72) Inventors: Yao Qian, Dublin, CA (US); Keelan Evanini, Pennington, NJ (US); Patrick Lange, San Francisco, CA (US); Robert A. Pugh, San Jose, CA (US); Rutuja Ubale, Union City, CA (US)

(73) Assignee: Educational Testing Service, Princeton, NJ (US)

( * ) Notice: Subject to any disclaimer, the term of this patent is extended or adjusted under 35 U.S.C. 154(b) by 93 days.

(21) Appl. No.: 16/221,980

(22) Filed: Dec. 17, 2018

Related U.S. Application Data (60) Provisional application No. 62/599,436, filed on Dec. 15, 2017.

(51) Int. Cl.
*G10L 15/00* (2013.01)
*G06N 3/04* (2006.01)
(Continued)

(52) U.S. Cl.
CPC .......... *G10L 15/005* (2013.01); *G06N 3/0454* (2013.01); *G06N 3/08* (2013.01);
(Continued)

(58) Field of Classification Search
CPC .......................... G10L 15/005; G06N 3/0454
See application file for complete search history.

(56) References Cited

U.S. PATENT DOCUMENTS

| | | | | |
|---|---|---|---|---|
| 7,778,834 | B2 * | 8/2010 | Higgins ................. | G09B 19/06 434/167 |
| 8,190,420 | B2 * | 5/2012 | Kadirkamanathan ........................ | G10L 15/187 704/2 |

(Continued)

OTHER PUBLICATIONS

Matsunaga, Shoichi, et al. "Non-native English speech recognition using bilingual English lexicon and acoustic models." 2003 IEEE International Conference on Acoustics, Speech, and Signal Processing, 2003. Proceedings.(ICASSP'03) . . . vol. 1. IEEE, 2003. (Year: 2003).*

(Continued)

*Primary Examiner* — Shaun Roberts
(74) *Attorney, Agent, or Firm* — Jones Day (57) ABSTRACT

Systems and methods for identifying a person's native language, are presented. A native language identification system, comprising a plurality of artificial neural networks, such as time delay deep neural networks, is provided. Respective artificial neural networks of the plurality of artificial neural networks are trained as universal background models, using separate native language and non-native language corpora. The artificial neural networks may be used to perform voice activity detection and to extract sufficient statistics from the respective language corpora. The artificial neural networks may use the sufficient statistics to estimate respective T-matrices, which may in turn be used to extract respective i-vectors. The artificial neural networks may use i-vectors to generate a multilayer perceptron model, which may be used to identify a person's native language, based on an utterance by the person in his or her non-native language.

20 Claims, 8 Drawing Sheets

(51) Int. Cl.
    G10L 15/16    (2006.01)
    G10L 25/78    (2013.01)
    G06N 3/08     (2006.01)
    G09B 19/04    (2006.01)
(52) U.S. Cl.
    CPC .............. *G09B 19/04* (2013.01); *G10L 15/16* (2013.01); *G10L 25/78* (2013.01)

(56) References Cited

U.S. PATENT DOCUMENTS

| | | | | |
|---|---|---|---|---|
| 8,583,432 | B1* | 11/2013 | Biadsy | G10L 15/18 704/235 |
| 9,953,630 | B1* | 4/2018 | Aubrey | G10L 15/005 |
| 2004/0098259 | A1* | 5/2004 | Niedermair | G10L 15/005 704/254 |
| 2005/0033575 | A1* | 2/2005 | Schneider | G10L 15/005 704/254 |
| 2005/0197835 | A1* | 9/2005 | Reinhard | G10L 15/063 704/249 |
| 2007/0294082 | A1* | 12/2007 | Jouvet | G10L 15/005 704/231 |
| 2008/0177545 | A1* | 7/2008 | Li | G06F 40/211 704/255 |
| 2009/0004633 | A1* | 1/2009 | Johnson | G09B 19/04 434/169 |
| 2012/0010886 | A1* | 1/2012 | Razavilar | G10L 15/005 704/246 |
| 2012/0016672 | A1* | 1/2012 | Chen | G10L 25/60 704/236 |
| 2013/0238336 | A1* | 9/2013 | Sung | G10L 15/005 704/255 |
| 2014/0195239 | A1* | 7/2014 | Evanini | G10L 25/60 704/254 |
| 2015/0161522 | A1* | 6/2015 | Saon | G06N 3/0454 706/12 |
| 2015/0186359 | A1* | 7/2015 | Fructuoso | G10L 13/08 704/8 |
| 2015/0301796 | A1* | 10/2015 | Visser | G10L 15/22 715/728 |
| 2015/0364129 | A1* | 12/2015 | Gonzalez-Dominguez | G10L 15/005 704/251 |
| 2016/0253999 | A1* | 9/2016 | Kang | G09B 19/04 704/249 |
| 2018/0018973 | A1* | 1/2018 | Moreno | G10L 17/08 |
| 2018/0061397 | A1* | 3/2018 | Huang | G06N 3/0445 |
| 2018/0067918 | A1* | 3/2018 | Bellegarda | G10L 25/30 |
| 2018/0137109 | A1* | 5/2018 | Mangoubi | G10L 15/142 |
| 2018/0330719 | A1* | 11/2018 | Fridental | G10L 15/10 |

OTHER PUBLICATIONS

Fischer, V., et al. "Multilingual acoustic models for the recognition of non-native speech." IEEE Workshop on Automatic Speech Recognition and Understanding, 2001. ASRU'01 . . . IEEE, 2001. (Year: 2001).*

Dian, Xiaojun, Meng, Helen, Soong, Frank; The Use of DBN-I-HMMs for Mispronunciation Detection and Diagnosis in L2 English to Support Computer-Aided Pronunciation Training; Interspeech; pp. 775-778; 2012.

Dian, Yao, Tao, Jidong, Suendermann-Oeft, David, Evanini, Keelan, Ivanov, Alexei, Ramanarayanan, Vikram; Noise and Metadata Sensitive Bottleneck Features for Improving Speaker Recognition with Non-Native Speech Input; Interspeech; San Fransisco, CA; pp. 3648-3652; Sep. 2016.

Yang, Seung Hee, Na, Minsoo, Chung, Minhwa; Modeling Pronunciation Variations for Non-Native Speech Recognition of Korean Produced by Chinese Learners; Proceedings of SLaTE; Leipzig, Germany; pp. 95-99; Sep. 2015.

Arslan, Levent, Hansen, John; A Study of Temporal Features and Frequency Characteristics in American English Foreign Accent; Journal of Acoustical Society of America, 102(1); pp. 28-40; 1997.

Swan, Michael, Smith, Bernard; Learner English: A Teacher's Guide to Interference and Other Problems, 2nd Edition; Cambridge University Press; 2001.

The Stanford Natural Language Processing Group; Standford Dependencies; Stanford, CA; https://nlp.stanford.edu/software/stanford-dependencies.shtml.

Tetreault, Joel, Blanchard, Daniel, Cahill, Aoife; A Report on the First Native Language Identification Shared Task; Proceedings of the 8th Workshop on Innovative Use of NLP for Building Educational Applications; Atlanta, GA; pp. 48-57; Jun. 2013.

Schuller, Bjorn, Steidl, Stefan, Batliner, Anton, Hirschberg, Julia, Burgoon, Judee, Baird, Alice, Elkins, Aaron, Mang, Yue, Coutinho, Eduardo, Evanini, Keelan; The Interspeech 2016 Computational Paralinguistics Challenge: Deception, Sincerity & Native Language; Interspeech; San Francisco, CA; pp. 2001-2005; Sep. 2016.

Omar, Mohamed Kamal, Pelecanos, Jason; A Novel Approach to Detecting Non-Native Speakers and Their Native Language; Proceedings of IEEE International Conference on Acoustic, Speech and Signal Processing; pp. 4398-4401; 2010.

Lander, T. Cslu: Foreign Accented English Release 1.2 LDC2007S08. Web Download. Philadelphia: Linguistic Data Consortium, 2007.

Abad, Alberto, Ribeiro, Eugenio, Kepler, Fabio, Astudillo, Ramon, Trancoso, Isabel; Exploiting Phone Log-Likelihood Ratio Features for the Detection of the Native Language of Non-Native English Speakers; Interspeech; San Francisco, CA; pp. 2413-2417; Sep. 2016.

Shivakumar, Prashanth Gurunath, Chakravarthula, Sandeep Nallan, Georgiou, Panayiotis; Multimodal Fusion of Multirate Acoustic, Prosodic, and Lexical Speaker Characteristics for Native Language Identification; Interspeech; San Francisco, CA; pp. 2408-2412; Sep. 2016.

Lei, Yun Scheffer, Nicolas, Ferrer, Luciana, McLaren, Mitchell; A Novel Scheme for Speaker Recognition Using a Phonetically-Aware Deep Neural Network; Proceedings of IEEE ICASSP; pp. 1695-1699; 2014.

Snyder, David, Garcia-Romero, Daniel, Povey, Daniel; Time Delay Deep Neural Network-Based Universal Background Models for Speaker Recognition; Proceedings of IEEE Automatic Speech Recognition and Understanding; 2015.

Kenny, Patrick, Gupta, Vishwa, Stafylakis, Themos, Ouellet, Pierre, Alam, Jahangir; Deep Neural Networks for Extracting Baum-Welch Statistics for Speaker Recognition; Proceedings of Odyssey 2014; pp. 293-298; 2014.

Richardson, Fred, Reynolds, Doug, Dehak, Najim; A Unified Deep Neural Network for Speaker and Language Recognition; Proceedings of Interspeech; pp. 1146-1150; Sep. 2015.

Zheng, Hao, Zhang, Shanshan, Liu, Wenju; Exploring Robustness of DNN/RNN for Extracting Speaker Baum-Welch Statistics in Mismatched Conditions; Proceedings of Interspeech; pp. 1161-1165; Sep. 2015.

Dehak, Najim, Kenny, Patrick, Dehak, Reda, Dumouchel, Pierre, Ouellet, Pierre; Front-End Factor Analysis for Speaker Verification; IEEE Transactions on Acoustics, Speech, and Signal Processing, 19(4); pp. 788-798; Jun. 2011.

Waibel, Alexander, Hanazawa, Toshiyuki, Hinton, Geoffrey, Shikano, Kiyohiro, Lang, Kevin; Phoneme Recognition Using Time-Delay Neural Networks; IEEE Transactions on Acoustics, Speech, and Signal Processing, 37(3); pp. 328-339; Mar. 1989.

Waibel, Alex; Modular Construction of Time-Delay Neural Networks for Speech Recognition; Neural Computation, 1(1); pp. 39-46; Mar. 1989.

Peddinti, Vijayaditya, Povey, Daniel, Khudanpur, Sanjeev; A Time Delay Neural Network Architecture for Efficient Modeling of Long Temporal Contexts; Proceedings of Interspeech; 2015.

Ioffe, Sergey; Probabilistic Linear Discriminant Analysis; Computer Vision-ECCV 2006, Lecture Notes in Computer Science, 3954; pp. 531-542; 2006.

Garcia-Romero, Daniel, Espy-Wilson, Carol; Analysis of I-Vector Length Normalization in Speaker Recognition Systems; Interspeech; pp. 249-252; 2011.

(56) References Cited

OTHER PUBLICATIONS

Panayotov, Vassil, Chen, Guoguo, Povey, Daniel, Khudanpur, Sanjeev; Librispeech: An ASR Corpus Based on Public Domain Audio Books; Proceedings of IEEE International Conference on Acoustic, Speech and Signal Processing; pp. 5206-5210; 2015.

Povey, Daniel, Ghoshal, Arnab, Boulianne, Gilles, Burget, Lukas, Glembek, Ondrej, Goel, Nagendra, Hannemann, Mirko, Motlicek, Petr, Qian, Yanmin, Schwarz, Petr, Silovsky, Jan, Stemmer, Georg, Vesely, Karel; The Kaldi Speech Recognition Toolkit; Proceedings of the ASRU Workshop; 2011.

Qian, Yao, Evanini, Keelan, Wang, Xinhao, Suendermann-Oeft, David, Pugh, Robert, Lange, Patrick, Molloy, Hillary, Soong, Frank; Improving Sub-Phone Modeling for Better Native Language Identification with Non-Native English Speech; Interspeech, Stockholm, Sweden; pp. 2586-2590; Aug. 2017.

Peddinti, Vijayaditya; Chen, Guoguo, Manohar, Vimal, Ko, Tom, Povey, Daniel, Khudanpur, Sanjeev; Jhu Aspire System: Robust LVCSR with TDNNs, I-Vector Adaptation and RNN-LMs; Proceedings of IEEE Automatic Speech Recognition and Understanding; 2015.

Keras: The Python Deep Learning Library; Keras Documentation; http://keras.io.

Qian, Yao, Wang, Xinhao, Evanini, Keelan, Suendermann-Oeft, David; Self-Adaptive DNN for Improving Spoken Language Proficiency Assessment; Interspeech; San Francisco, CA; pp. 3122-3126; Sep. 2016.

Ellis, Rod; The Study of Second Language Acquisition; Oxford University Press: Oxford, UK; 2008.

Malmasi, Shervin, Dras, Mark; Language Transfer Hypotheses with Linear SVM Weights; Proceedings of the 2014 Conference on Empirical Methods in Natural Language Processing; Doha, Qatar; pp. 1385-1390; Oct. 2014.

Sadjadi, Seyed Omid, Ganapathy, Sriram, Pelecanos, Jason; The IBM 2016 Speaker Recognition System; Odyssey: Speaker and Language Recognition, Workshop; Bilbao, Spain; pp. 174-180; Jun. 2016.

Eyben, Florian, Weninger, Felix, Squartini, Stefano, Schuller, Bjorn; Real-Life Voice Activity Detection with LSTM Recurrent Neural Networks and Application to Hollywood Movies; Proceedings of International Conference on Acoustics, Speech, and Signal Processing; pp. 483-487 May 2013.

Hughes, Thad, Mierle, Keir; Recurrent Neural Networks for Voice Activity Detection; Proceedings of International Conference on Acoustics, Speech, and Signal Processing; pp. 7378-7382; 2013.

Zhang, Xiao-Lei, Wang, DeLiang; Boosting Contextual Information for Deep Neural Network Based Voice Activity Detection; Proceedings of IEEE Transaction on Audio, Speech, and Language Processing, 24(2); pp. 252-264; Feb. 2016.

Sohn, Jongseo, Kim, Nam Soo, Sung, Wonyong; A Statistical Model-Based Voice Activity Detection; IEEE Signal Processing Letter, 6(1); pp. 1-3; 1999.

Van Segbroeck, Maarten, Tsiartas, Andreas, Narayanan, Shrikanth; A Robust Frontend for VAD: Exploiting Contextual, Discriminative and Spectral Cues of Human Voice; Interspeech; Lyon, France; pp. 704-708; Aug. 2013.

* cited by examiner

NATIVE LANGUAGE IDENTIFICATION WITH TIME DELAY DEEP NEURAL NETWORKS TRAINED SEPARATELY ON NATIVE AND NON-NATIVE ENGLISH CORPORA

CROSS-REFERENCE TO RELATED APPLICATIONS

This application claims priority to U.S. Provisional Application No. 62/599,436, filed Dec. 15, 2017, the entirety of which is incorporated by reference herein.

TECHNICAL FIELD

The technology described herein relates to native language identification and more particularly, to the identification of an English learner's native language, based upon their non-native English speech.

BACKGROUND

Native language identification ("NLI") is the task of identifying the native language ("NL") of a person, based upon spoken or written input in a second language, i.e., a non-native language ("NNL"). NLI from speech works under the assumption that a speaker's NNL production patterns are influenced by the speaker's NL, i.e., "language transfer." In second-language acquisition, language transfer makes the acquisition process quite different from first-language acquisition. Language transfer can occur in all aspects of linguistic production, including grammar, pronunciation, vocabulary and discourse.

For example, many French English learners delete the glottal fricative /h/ and replace the dental fricatives /θ/ or /ð/ with /s/ and /z/, respectively since French does not contain these phonemes. Another example is the epenthetic vowels that are commonly produced in syllable-final position by Japanese English speakers; this is due to the fact that Japanese syllable structure does not allow syllable-final consonants (except for /n/). NLI from written input reveals common language-usage patterns in specific NL groups. Foreign language learners with different NL backgrounds make different errors in grammar, vocabulary and other areas when learning a new language.

In recent years, there has been growing interest in NLI for applications in second-language acquisition and forensic linguistics. The common pronunciation errors made by NNL learners may be used to build an NL-NNL phone confusion table, which is useful for designing more NL customized pronunciation training. Linguistic origin analysis and dialectology can also be a useful tool for criminal intelligence and law enforcement agencies. In addition, NL information or NL detection scores can be used to improve: (1) the performance of speaker recognition systems with a phonetically-aware universal background model ("UBM"); (2) speech recognition by modeling pronunciation variation between native speakers and NL-specific speakers; and (3) other human-machine voice interface applications, e.g., facilitating a spoken dialog system, which can benefit from an awareness of the user's cultural background as suggested by the identified NL.

SUMMARY

Systems and methods are provided identifying a person's NL based on a NNL utterance by the person. For example, in an exemplary method, a NLI system, comprising a plurality of artificial neural networks, is provided. A first artificial neural network of the plurality of artificial neural networks may be trained as a UBM using a NL corpus. A second artificial neural network of the plurality of artificial neural networks may be trained as a UBM using a NNL corpus. Sufficient statistics may be extracted from the NL corpus and the NNL corpus respectively, using the plurality of artificial neural networks.

Total variability matrices ("T-matrix") for the NL corpus and the NNL corpus may be estimated using the NL sufficient statistics and the NNL sufficient statistics, respectively. i-vectors may be extracted for the NL corpus and the NNL corpus using the T-matrices. A multilayer perceptron ("MLP") model may be generated using the i-vectors. Using the MLP model, a person's NL may then be identified, based on a NNL utterance by that person.

As another example, a system for identifying a person's NL based on a NNL utterance by the person, is provided. The system may comprise one or more data processors and a non-transitory computer-readable medium encoded with instructions for commanding the one or more data processors to execute steps of a process. The process may comprise: providing a NLI system, comprising a plurality of artificial neural networks; training a first artificial neural network of the plurality of artificial neural networks as a UBM using a NL corpus; training a second artificial neural network of the plurality of artificial neural networks as a UBM using a NNL corpus; extracting sufficient statistics from the NL corpus and the NNL corpus respectively, using the plurality of artificial neural networks; estimating a T-matrix for the NL corpus using the NL sufficient statistics and a T-matrix for the NNL corpus using the NNL sufficient statistics; extracting an i-vector for the NL corpus using the NL T-matrix and an i-vector for the NNL corpus using the NNL T-matrix; generating a MLP model using the NL i-vector and the NNL i-vector; and using the MLP model to identify a person's NL based on a NNL utterance by the person.

As yet another example, a non-transitory computer-readable medium encoded with instructions for identifying a person's NL based on a NNL utterance by the person may be provided. The method may comprise: providing a NLI system, comprising a plurality of artificial neural networks; training a first artificial neural network of the plurality of artificial neural networks as a UBM using a NL corpus; training a second artificial neural network of the plurality of artificial neural networks as a UBM using a NNL corpus; extracting sufficient statistics from the NL corpus and the NNL corpus respectively, using the plurality of artificial neural networks; estimating a T-matrix for the NL corpus using the NL sufficient statistics and a T-matrix for the NNL corpus using the NNL sufficient statistics; extracting an i-vector for the NL corpus using the NL T-matrix and an i-vector for the NNL corpus using the NNL T-matrix; generating a MLP model using the NL vector and the NNL i-vector; and using the MLP model to identify a person's NL based on a NNL utterance by the person.

DETAILED DESCRIPTION

Figure 1:
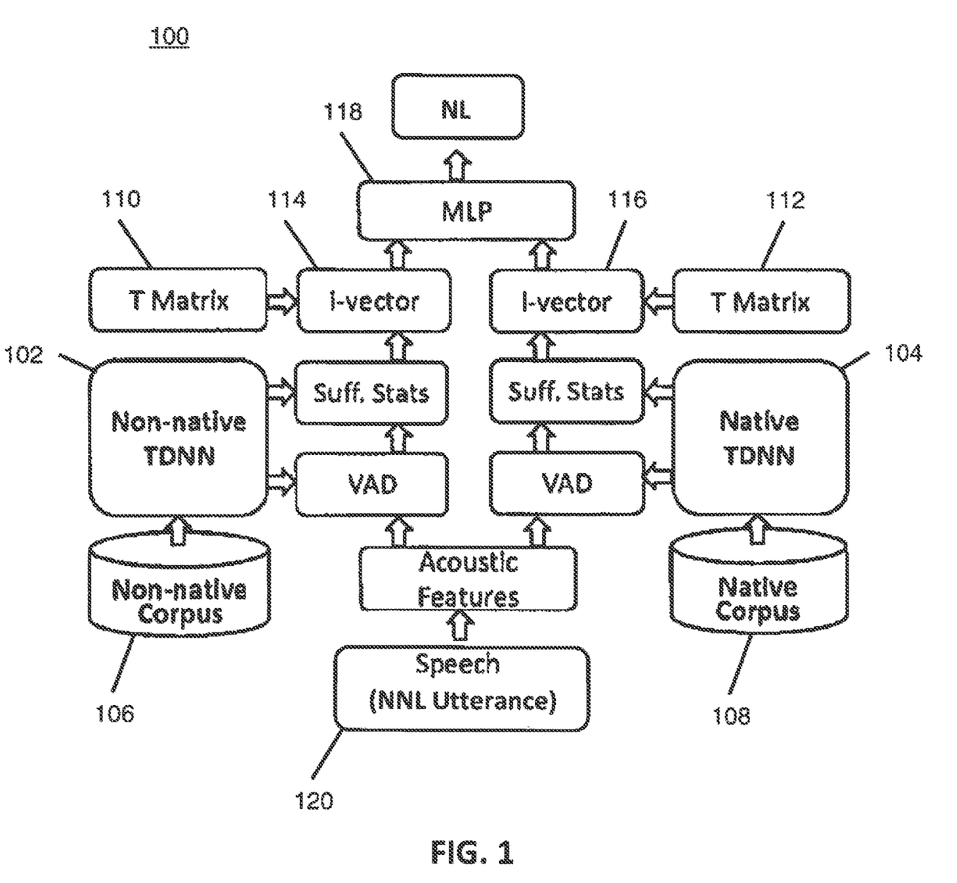
FIG. 1 is a diagram depicting a system for identifying a person's native language.

Systems and methods as described herein provide an improved approach of NLI. FIG. 1 is a diagram depicting an exemplary system 100 for identifying a person's NL, based upon that person's NNL speech. For example, the system 100 may identify an English learner's NL, based upon the person's NNL speech, i.e., the person's non-native English speech.

The system 100 comprises a plurality of artificial neural networks ("ANN") 102, 104. In the exemplary embodiment of FIG. 1, the plurality of ANNs comprises two time delay deep neural networks ("TDNN"), including: (1) a non-native TDNN 102; and (2) a native TDNN 104. It should be appreciated, however, that the plurality of ANNs may comprise any number and/or type of appropriate ANN, e.g., a feedforward neural network, a recurrent neural network, etc. As discussed in more detail below, the TDNNs 102, 104 may be used to investigate language transfer on pronunciation by projecting a NNL speaker's speech to both NL speakers' and NNL speakers' sub-phonemic spaces, which may be modeled by the TDNNs 102, 104, respectively.

Figure 2A:
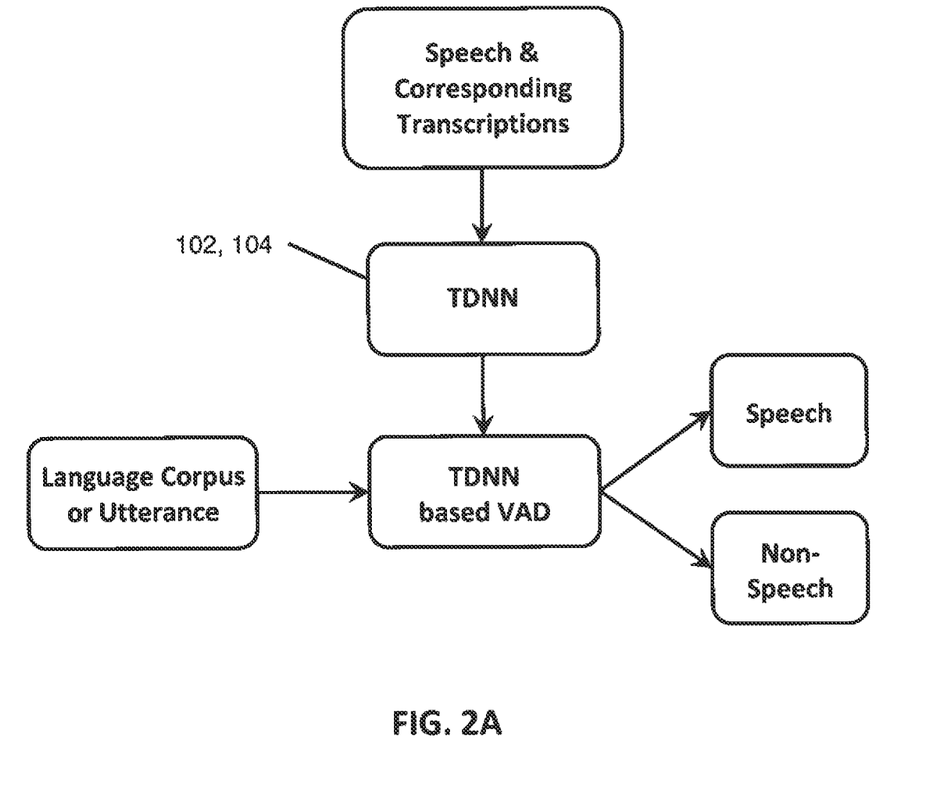
FIG. 2A is a diagram depicting a process of training a time delay deep neural network to perform voice activity detection.

The TDNNs 102, 104 may perform various functions. For example, as shown in FIG. 2A, the TDNNs 102, 104 may be trained and used to perform voice activity detection ("VAD") to separate speech from non-speech, e.g., silence, background noise, etc. Among other training methods, the TDNNs 102, 104 may be trained to perform VAD using speech accompanied by corresponding transcripts. In this way, a phone posteriorgram, i.e., the posteriors of senones over time, may be generated by summing the posteriors of senones (the output nodes of the TDNNs 102, 104) of the same phone. Those frames in which non-speech label has the highest posterior may be disregarded, thereby separating speech from non-speech.

It should be appreciated that although the TDNNs 102, 104 may be used to perform VAD, VAD may be performed by any other appropriate method and/or system, e.g., energy based VAD, statistical model-based VAD, etc., in addition to or in lieu of the TDNNs 102, 104.

Figure 2B:
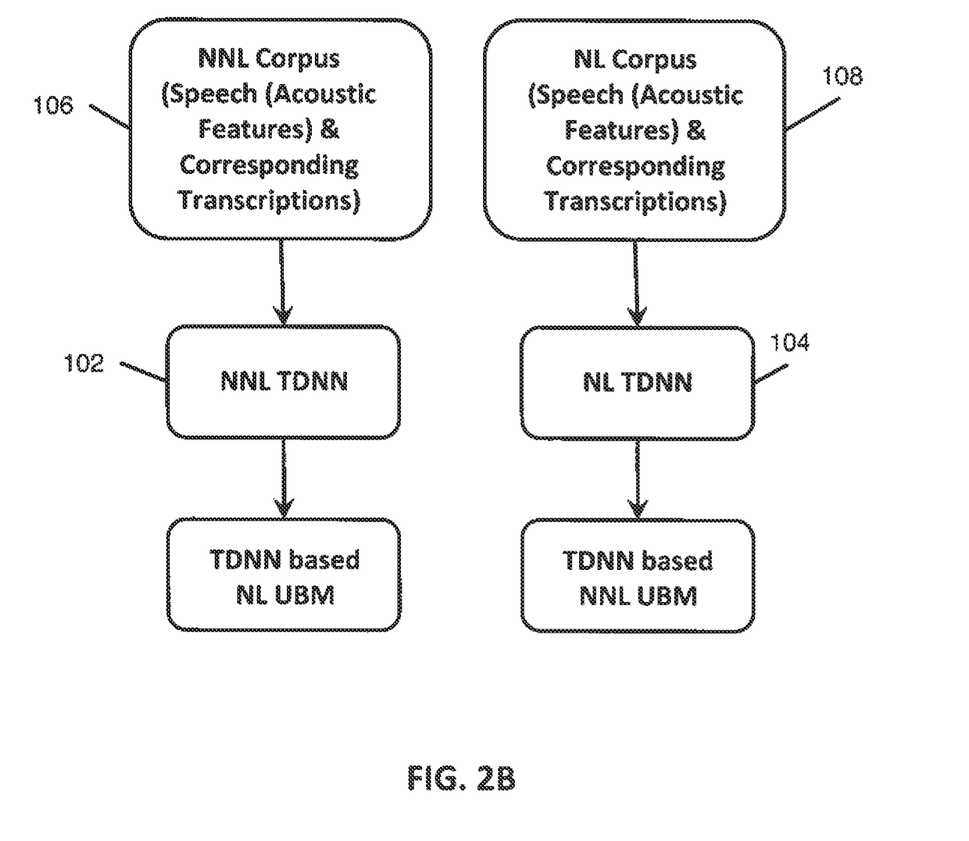
FIG. 2B is a diagram depicting a process of training time delay deep neural networks as universal background models.

As shown in FIG. 2B, the TDNNs 102, 104 may also be trained and used as respective universal background models ("UBM"). For example, among other training methods, the non-native TDNN 102 may be trained using a NNL corpus 106, e.g., a NNL large vocabulary continuous speech recognition ("LVCSR") corpus, and the native TDNN 104 may be trained using a NL corpus 108, e.g., a NL LVCSR corpus, such as LibriSpeech. The corpora 106, 108 may include: (1) speech, converted to acoustic feature vectors, e.g., Mel Frequency Cepstral Coefficient ("MFCC") vectors; and (2) corresponding transcriptions. The TDNNs 102, 104 may be trained for use as UBMs using various algorithms, e.g., a backpropagation algorithm, a stochastic gradient descent optimization algorithm with cross-entropy loss function, etc.

It should be appreciated that the corpora 106, 108 may cover varying degrees of the phonetic space. For example, the NL corpus 108, which may be collected worldwide and contain any appropriate number of NLs, may contain authentic, native phone pronunciations and the projection to such a space may be distinguishable for pronunciation errors. The NNL corpus 106, which may be collected from non-native English speakers, may cover the phone variabilities caused by different accents of non-native English speakers and NL effects. As will be discussed in more detail below, the projection of the affected English speech to this space may help distinguish different NLs.

Figure 2C:
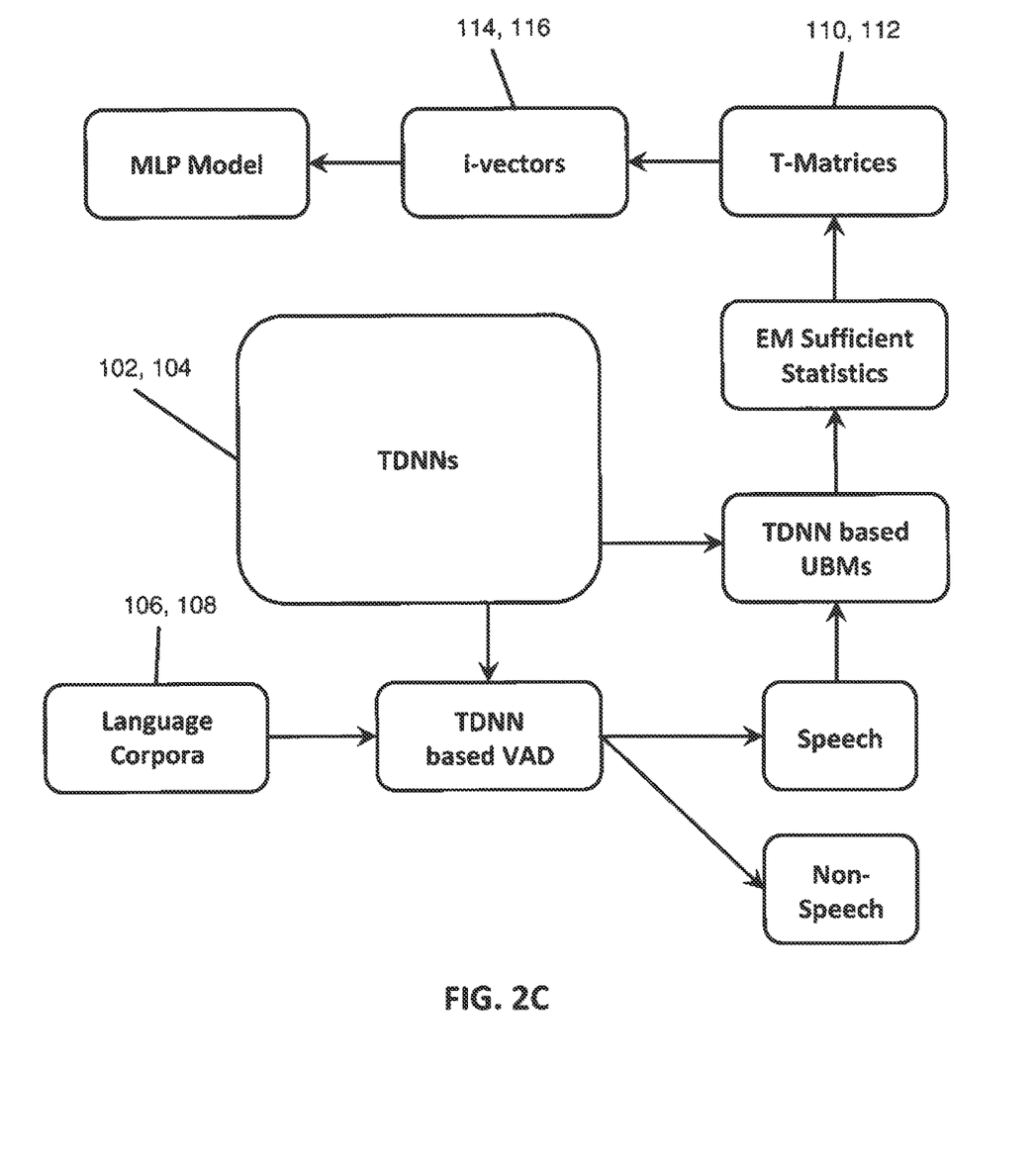
FIG. 2C is a diagram depicting a process of using time delay deep neural networks to generate a multilayer perceptron model.

As shown in FIG. 2C, the TDNNs 102, 104 may also be used to calculate "sufficient statistics" for i-vector extraction. To extract the i-vector, the TDNNs 102, 104 may be employed to perform VAD on the corpora 106, 108, thereby separating speech from non-speech within the corpora 106, 108. The TDNNs 102, 104 may then be used as UBMs to extract sufficient statistics from the respective corpora 106, 108. The sufficient statistics:

$$N_k(u) = \sum_t \gamma_{kt}^{(u)} \tag{1}$$

$$F_k(u) = \sum_t \gamma_{kt}^{(u)}(x_t^{(u)} - m_k) \tag{2}$$

may be computed to learn the basis functions of the total variability in the acoustic space of the corpora 106, 108. N(u) and F(u) are the $0^{th}$-order and mean shifted $1^{st}$ order statistics for the u-th speech segment, respectively. $\gamma_{kt}^{(u)}$ is the stochastic alignment of the t-th frame of speech feature vectors, $x_t^{(u)}$, i.e., the posterior probability calculated from a UBM. The TDNNs 102, 104 may be used as UBMs and employed to extract the sufficient statistics. The $\gamma_{kt}^{(u)}$ may be computed from a soft-max output of the TDNNs 102, 104.

$$\gamma_{kt}^{(u)} = p(s_k | x_t^{(u)}) \tag{3}$$

where $s_k$ is the k-th senone of the TDNNs 102, 104 outputs and $x_t^{(u)}$ is a spliced input vector.

The sufficient statistics may be used by the TDNNs 102, 104 to estimate respective low-rank, T-matrices—a NNL T-matrix 110 and a NL T-matrix 112—which represent the total variability in the acoustic space of the corpora 106, 108. The T-matrices 110, 112 may be produced using, e.g., factor analysis, an expectation-maximization algorithm, etc. The TDNNs 102, 104 may then be used to produce respective i-vectors—a NNL i-vector 114 and a NL i-vector 116—from the respective T-matrices 110, 112. The i-vectors 114, 116 are compact acoustic-phonetic representations of speech in a subspace, i.e., the supervectors (in the subphonemic space) are projected onto a lower dimensional i-vector space. Due to this projection, each coordinate in the i-vector space may lose its original phonetic meaning. To keep the phonetic labels in the original supervector, senone posteriors may be used, or the senone posteriorgram may be averaged over a whole utterance of speech after removing non-speech frames.

The i-vectors 114, 116 extracted by the TDNNs 102, 104, may be used jointly for proper NL recognition. For example, using the i-vectors 114, 116, probabilistic linear discriminant analysis ("PLDA") may be used to calculate the log likelihood ratio of the hypothesis that two i-vectors share the same NL identity to the hypothesis that two i-vectors are from different NLs. A discriminative classifier, however, may be more appropriate than PLDA for NLI when there are larger sets of NLs being recognized, e.g., 25 NLs. It should be appreciated, however, that discriminative classifiers may be used for any number of NLs. For example, among other discriminative classifiers, the i-vectors 114, 116 may be fed into a discriminative MLP classifier for NL recognition.

Specifically, the TDNNs 102, 104 may be used to generate a MLP model 118 using the i-vectors 114, 116. The MLP model 118 may be generated using various algorithms, e.g., a backpropagation algorithm, a stochastic gradient descent optimization algorithm with cross-entropy loss function, etc. As will be discussed in more detail below, the MLP 118 may be used for NL identification.

As shown in FIG. 1, having trained the system 100 as discussed above, a person may provide a spoken utterance 120 to the system 100 in the person's NNL (Step 200). The utterance 120 may be converted to acoustic feature vectors, e.g., MFCC vectors (Step 202). The non-native TDNN 102 may perform VAD on the utterance 120, thereby separating speech from non-speech within the utterance 120. The non-native TDNN 102 then may extract sufficient statistics from the utterance 120 (Step 204). The non-native TDNN 102 may estimate a T-matrix from the sufficient statistics (Step 206) and generate an i-vector therefrom (Step 208). This i-vector may be fed into the PLDA or MLP classifier to identify the person's NL (Step 210).

Having identified the person's NL, one of any number of steps may then be performed based on the particular NL. For example, if a person provides an utterance to an automated answering service, the answering service may provide the person with the choice of interacting with the answering service in his or her NL. Additionally or alternatively, the answering service may route the person to a representative that is fluent in his or her NL. As yet another example, if a person provides an utterance to an automated testing system, the testing system may provide the person with the choice of taking the test in his or her NL. The system 100 may also be used in screening procedures, e.g., pre-employment screening.

Figure 3A:
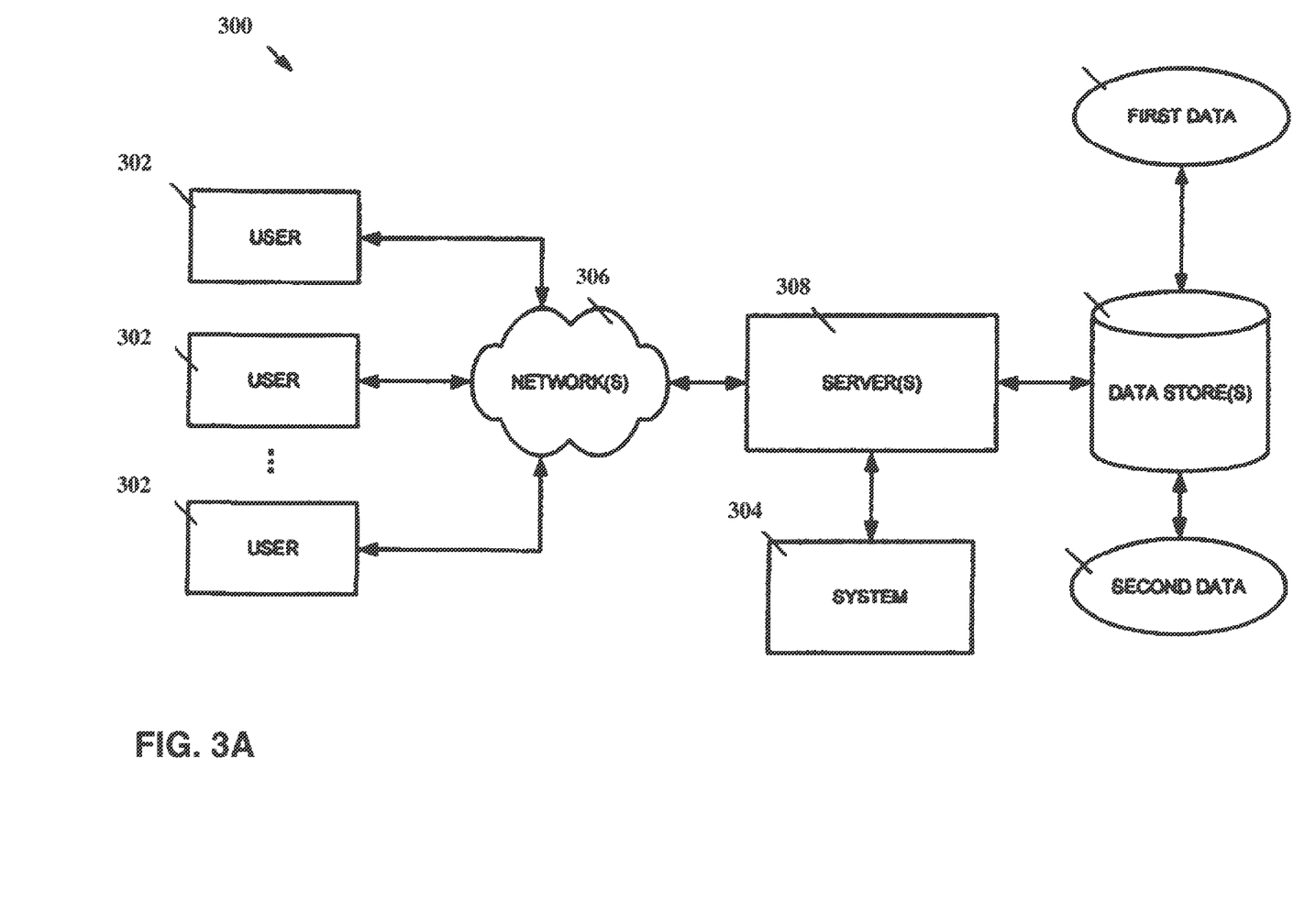
FIGS. 3A, 3B, 3C and 3D depict example systems for implementing various aspects described herein.

FIG. 3A depicts a computer-implemented environment 300 wherein users 302 can interact with a system 304, e.g., system 100, hosted on one or more servers 308 through one or more networks 306. The system 304 contains software operations or routines. The users 302 can interact with the system 304 in a number of ways, such as over the one or more networks 306. The one or more servers 308 accessible through the network(s) 306 can host system 304. It should be understood that the system 304 could also be provided on a stand-alone computer for access by a user.

Figure 3B:
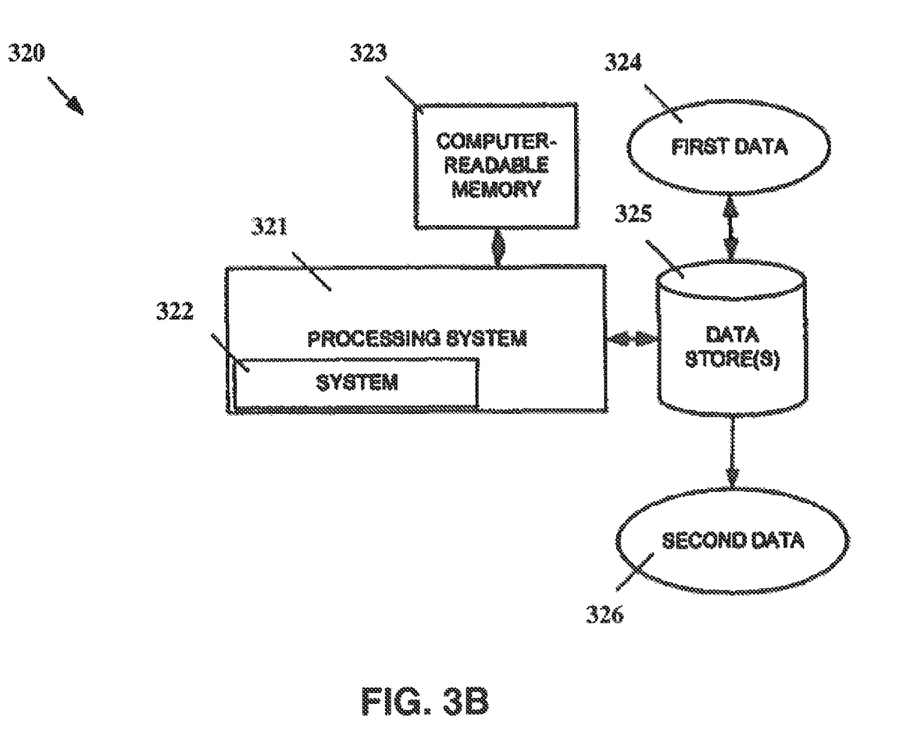

FIGS. 3B, 3C and 3D depict example systems for use in implementing a system. For example, FIG. 3B depicts an exemplary system 320, e.g., system 100, that includes a standalone computer architecture where a processing system 321, e.g., one or more computer processors, includes a system 322 being executed on it. The processing system 321 has access to a non-transitory computer-readable memory 323 in addition to one or more data stores 325. The one or more data stores 325 may contain first data 324 as well as second data 326.

Figure 3C:
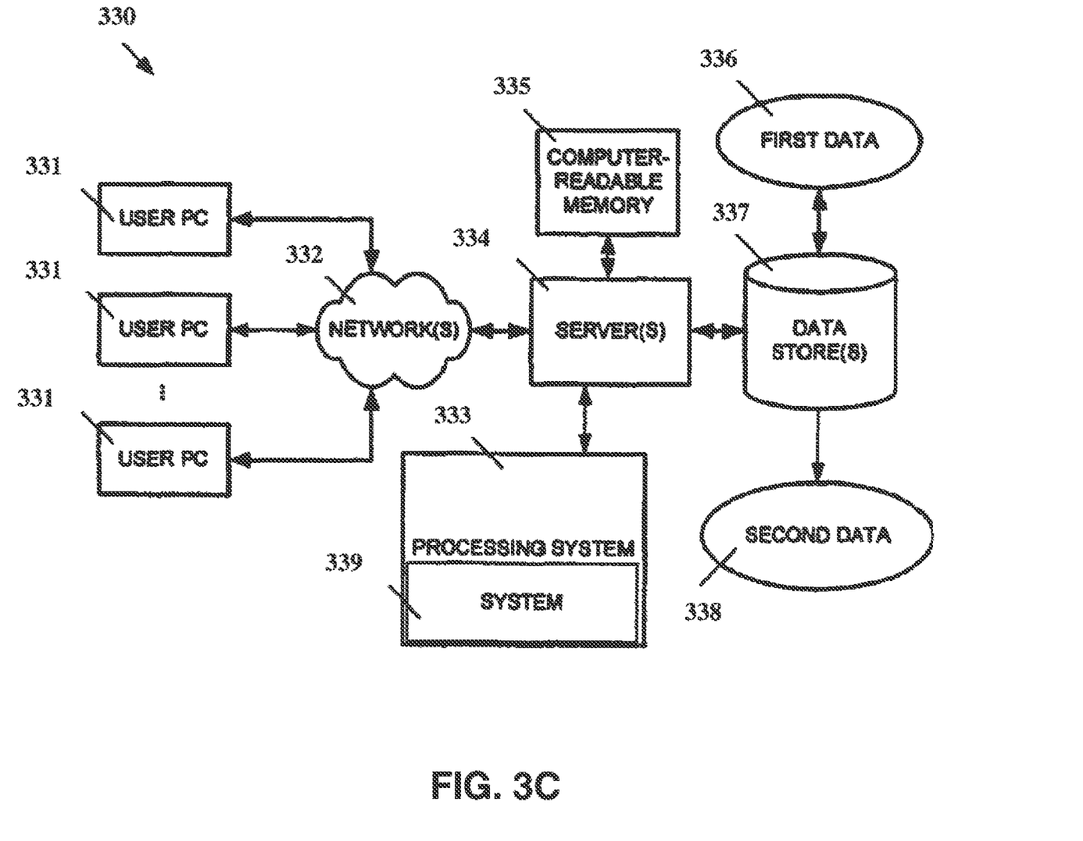

FIG. 3C depicts a system 330, e.g., system 100, that includes a client server architecture. One or more user PCs 331 accesses one or more servers 334 running a system 339 on a processing system 333 via one or more networks 332. The one or more servers 334 may access a non-transitory computer readable memory 335 as well as one or more data stores 337. The one or more data stores 337 may contain first data 336 as well as second data 338.

Figure 3D:
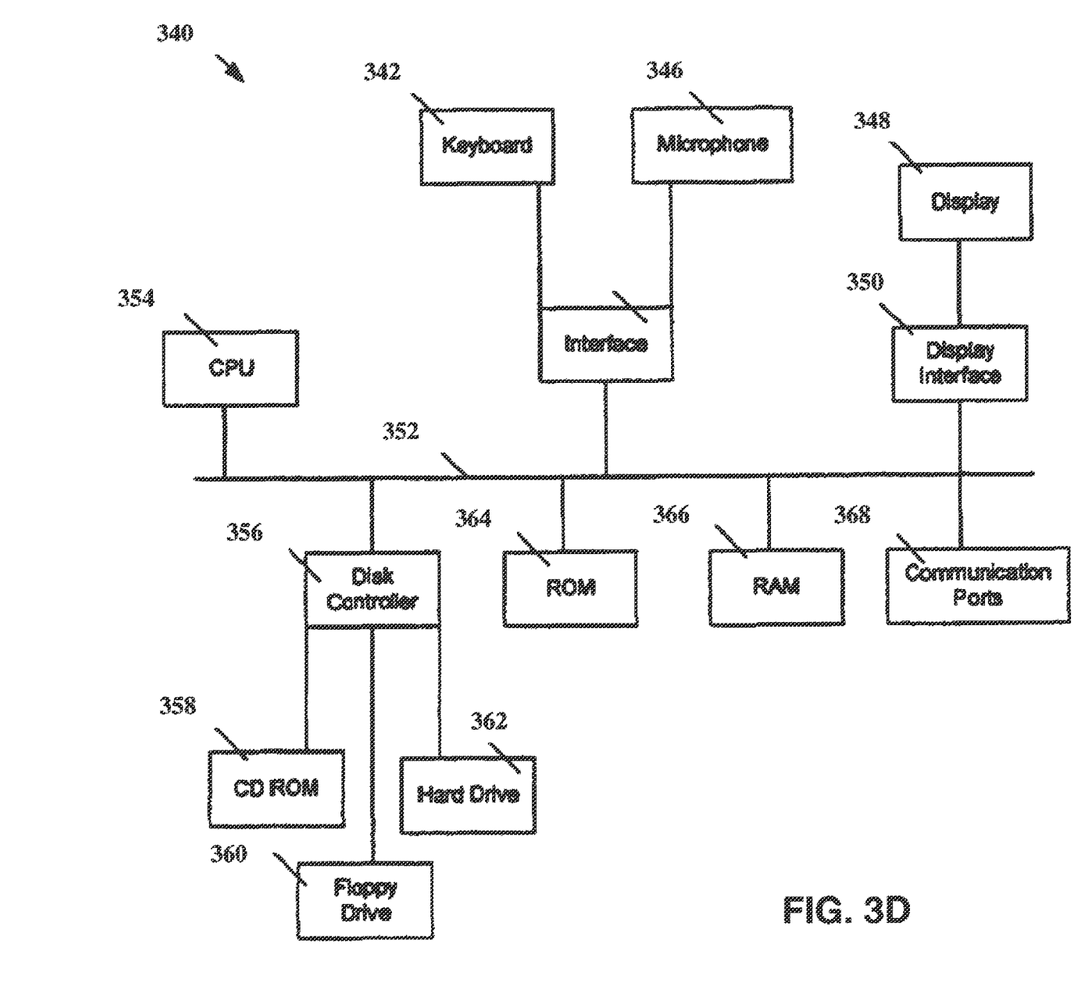

FIG. 3D shows a block diagram of exemplary hardware for a standalone computer architecture 340, such as the architecture depicted in FIG. 3B, that may be used to contain and/or implement the program instructions of system embodiments of the present disclosure. A bus 352 may serve as the information highway interconnecting the other illustrated components of the hardware. A processing system 354 labeled CPU (central processing unit), e.g., one or more computer processors, may perform calculations and logic operations required to execute a program. A non-transitory computer-readable storage medium, such as read only memory (ROM) 364 and random access memory (RAM) 366, may be in communication with the processing system 354 and may contain one or more programming instructions. Optionally, program instructions may be stored on a non-transitory computer-readable storage medium such as a magnetic disk, optical disk, recordable memory device, flash memory or other physical storage medium. Computer instructions may also be communicated via a communications signal or a modulated carrier wave, e.g., such that the instructions may then be stored on a non-transitory computer-readable storage medium.

A disk controller 356 interfaces one or more optional disk drives to the system bus 352. These disk drives may be external or internal floppy disk drives 360, external or internal CD-ROM, CD-R, CD-RW or DVD drives 358, or external or internal hard drives 362. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 356, the ROM 364 and/or the RAM 366. Preferably, the processor 354 may access each component as required.

A display interface 350 may permit information from the bus 352 to be displayed on a display 348 in audio, graphic or alphanumeric format. Communication with external devices may optionally occur using various communication ports 368.

In addition to the standard computer-type components, the hardware may also include data input devices, such as a keyboard 342 or other input device such as a microphone, camera, etc. 346.

This written description describes exemplary embodiments of the present disclosure, but other variations fall within the scope of the disclosure. For example, the systems and methods may include and utilize data signals conveyed via networks, e.g., local area network, wide area network, internet, combinations thereof, etc., fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code or any other stored data that is operable to cause a processing system to perform the methods and operations described herein. Any suitable computer languages may be used such as C, C++, Java, Python, etc., as will be appreciated by those skilled in the art. Other implementations may also be used, however, such as firmware or even appropriately designed hardware configured to carry out the methods and systems described herein.

The systems' and methods' data, e.g., associations, mappings, data input, data output, intermediate data results, final data results, etc., may be stored and implemented in one or more different types of computer-implemented data stores, such as different types of storage devices and programming constructs, e.g., RAM, ROM, Flash memory, flat files, databases, programming data structures, programming variables, IF-THEN (or similar type) statement constructs, etc. It is noted that data structures describe formats for use in organizing and storing data in databases, programs, memory or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method of identifying a person's native language (NL) based on a non-native language (NNL) utterance by the person, the method comprising:
   providing a native language identification (NLI) system, the system comprising a plurality of artificial neural networks;
   training a first artificial neural network of the plurality of artificial neural networks as a universal background model (UBM) using a NL corpus;
   training a second artificial neural network of the plurality of artificial neural networks as a UBM using a NNL corpus;
   extracting sufficient statistics from the NL corpus and the NNL corpus respectively, using the plurality of artificial neural networks;
   estimating a total variability matrix ("T-matrix") for the NL corpus using the NL sufficient statistics and a T-matrix for the NNL corpus using the NNL sufficient statistics;
   extracting an i-vector for the NL corpus using the NL T-matrix and an i-vector for the NNL corpus using the NNL T-matrix;
   generating a multilayer perceptron (MLP) model using the NL i-vector and the NNL vector; and
   using the MLP model to identify a person's NL based on a NNL utterance by the person.

2. The method of claim 1, wherein the plurality of artificial neural networks comprises a plurality of time delay deep neural networks.

3. The method of claim 1, further comprising separating speech from non-speech in the NL corpus and the NNL corpus.

4. The method of claim 3, wherein separating speech from non-speech comprises performing voice activity detection.

5. The method of claim 3, wherein separating speech from non-speech is performed by the plurality of artificial neural networks.

6. The method of claim 1, wherein the NL corpus and the NNL corpus comprise speech and corresponding transcriptions.

7. The method of claim 6, further comprising converting the speech of the NL corpus and the NNL corpus into acoustic feature vectors.

8. The method of claim 1, further comprising capturing the NNL utterance.

9. The method of claim 1, further comprising:
   extracting sufficient statistics from the NNL utterance using the plurality of artificial neural networks;
   estimating a T-matrix using the sufficient statistics of the NL corpus and the NNL corpus;
   extracting an i-vector for the NNL utterance using the T-matrix;
   feeding the NNL utterance i-vector into the MLP model to identify the person's NL.

10. The method of claim 9, further comprising separating speech from non-speech in the NNL utterance.

11. The method of claim 9, further comprising converting speech of the NNL utterance into acoustic feature vectors.

12. The method of claim 1, further comprising modifying an external system based on the person's NL.

13. The method of claim 12, wherein the external system is a testing system.

14. A system of identifying a person's native language (NL) based on a non-native language (NNL) utterance by the person, the system comprising:
   one or more data processors; and
   a non-transitory computer-readable medium encoded with instructions for commanding the one or more data processors to execute steps of a process, the process comprising:
      providing a native language identification (NLI) system, the system comprising a plurality of artificial neural networks;
      training a first artificial neural network of the plurality of artificial neural networks as a universal background model (UBM) using a NL corpus;
      training a second artificial neural network of the plurality of artificial neural networks as a UBM using a NNL corpus;
      extracting sufficient statistics from the NL corpus and the NNL corpus respectively, using the plurality of artificial neural networks;
      estimating a total variability matrix ("T-matrix") for the NL corpus using the NL sufficient statistics and a T-matrix for the NNL corpus using the NNL sufficient statistics;
      extracting an i-vector for the NL corpus using the NL T-matrix and an i-vector for the NNL corpus using the NNL T-matrix;
      generating a multilayer perceptron (MLP) model using the NL i-vector and the NNL i-vector; and
      using the MLP model to identify a person's NL based on a NNL utterance by the person.

15. The system of claim 14, wherein the plurality of artificial neural networks comprises a plurality of time delay deep neural networks.

16. The system of claim 14, wherein the process further comprises separating speech from non-speech in the NL corpus and the NNL corpus.

17. The system of claim 16, wherein the process further comprises converting the speech of the NL corpus and the NNL corpus into acoustic feature vectors.

18. The system of claim 14, further comprising:
extracting sufficient statistics from the NNL utterance using the plurality of artificial neural networks;
estimating a T-matrix using the sufficient statistics of the NL corpus and the NNL corpus;
extracting an i-vector for the NNL utterance using the T-matrix;
feeding the NNL utterance i-vector into the MLP model to identify the person's NL.

19. A non-transitory computer-readable medium encoded with instructions for commanding one or more data processors to execute a method of identifying a person's native language (NL) based on a non-native language (NNL) utterance by the person, the method comprising:
providing a native language identification (NLI) system, the system comprising a plurality of artificial neural networks;
training a first artificial neural network of the plurality of artificial neural networks as a universal background model (UBM) using a NL corpus;
training a second artificial neural network of the plurality of artificial neural networks as a UBM using a NNL corpus;
extracting sufficient statistics from the NL corpus and the NNL corpus respectively, using the plurality of artificial neural networks;
estimating a total variability matrix ("T-matrix") for the NL corpus using the NL sufficient statistics and a T-matrix for the NNL corpus using the NNL sufficient statistics;
extracting an i-vector for the NL corpus using the NL T-matrix and an i-vector for the NNL corpus using the NNL T-matrix;
generating a multilayer perceptron (MLP) model using the NL i-vector and the NNL vector; and
using the MLP model to identify a person's NL based on a NNL utterance by the person.

20. The non-transitory computer-readable medium of claim 19, wherein the method further comprises:
extracting sufficient statistics from the NNL utterance using the plurality of artificial neural networks;
estimating a T-matrix using the sufficient statistics of the NL corpus and the NNL corpus;
extracting an i-vector for the NNL utterance using the T-matrix;
feeding the NNL utterance i-vector into the MLP model to identify the person's NL.

* * * * *